United States Patent
Greiner et al.

(10) Patent No.: US 11,225,826 B2
(45) Date of Patent: Jan. 18, 2022

(54) WINDOW UNITS MADE USING CERAMIC FRIT THAT DISSOLVES PHYSICAL VAPOR DEPOSITION (PVD) DEPOSITED COATINGS, AND/OR ASSOCIATED METHODS

(71) Applicants: GUARDIAN GLASS, LLC, Auburn Hills, MI (US); GUARDIAN EUROPE S.À R.L., Bertrange (LU)

(72) Inventors: Ralf Greiner, Muldestausee (DE); Mario Olbrich, Leipzig (DE); Matthew S. Walp, Royal Oak, MI (US)

(73) Assignee: GUARDIAN GLASS, LLC., Auburn Hills, MI (US)

( * ) Notice: Subject to any disclaimer, the term of this patent is extended or adjusted under 35 U.S.C. 154(b) by 1046 days.

(21) Appl. No.: 14/769,634

(22) PCT Filed: Feb. 24, 2014

(86) PCT No.: PCT/US2014/017899
§ 371 (c)(1),
(2) Date: Aug. 21, 2015

(87) PCT Pub. No.: WO2014/133929
PCT Pub. Date: Sep. 4, 2014

(65) Prior Publication Data
US 2015/0376935 A1 Dec. 31, 2015

Related U.S. Application Data

(60) Provisional application No. 61/771,060, filed on Feb. 28, 2013.

(51) Int. Cl.
*C03C 17/00* (2006.01)
*E06B 3/673* (2006.01)
(Continued)

(52) U.S. Cl.
CPC ........ *E06B 3/67356* (2013.01); *C03C 17/002* (2013.01); *C03C 17/36* (2013.01);
(Continued)

(58) Field of Classification Search
CPC ..... C03C 8/02; C03C 17/002; C03C 17/3684; C03C 17/3649; C03C 17/3644;
(Continued)

(56) References Cited

U.S. PATENT DOCUMENTS 5,118,983 A   6/1992   Morita et al.
5,332,412 A * 7/1994   Manabe ............... C03C 8/14
                                                427/266
(Continued)

FOREIGN PATENT DOCUMENTS

WO   WO 2012/172269   12/2012
WO   WO 2012/177539   12/2012

OTHER PUBLICATIONS

International Search Report for PCT/US2014/017899, dated May 16, 2014, 3 pages.
(Continued)

*Primary Examiner* — Rodney G McDonald

(57) ABSTRACT

Certain example embodiments relate to the use of a ceramic frit that dissolves an already-applied thin film coating (disposed via a physical vapor deposition (PVD) process such as sputtering, or other suitable process). In certain example embodiments, the ceramic frit is aggressive in chemically removing the coating on which it is disposed, e.g., when exposed to high temperatures. The frit advantageously fuses well with the glass, provides aesthetically desired colorations, and/or enables components (e.g., insulated glass (IG) unit spacers) to be reliably mounted thereon, in certain example embodiments. Associated coated articles, IG units, methods, etc., are also contemplated herein.

13 Claims, 3 Drawing Sheets

(51) Int. Cl.
*C03C 17/36* (2006.01)
*E06B 3/663* (2006.01)
*E06B 3/67* (2006.01)

(52) U.S. Cl.
CPC ...... *C03C 17/3644* (2013.01); *C03C 17/3649* (2013.01); *C03C 17/3684* (2013.01); *E06B 3/66304* (2013.01); *E06B 3/6722* (2013.01); *E06B 3/6733* (2013.01)

(58) Field of Classification Search
CPC ..... C03C 17/36; C23C 28/30; E06B 3/67356; E06B 3/66304; E06B 3/6722; E06B 3/6733
See application file for complete search history.

(56) References Cited

U.S. PATENT DOCUMENTS

| | | | |
|---|---|---|---|
| 5,344,718 A | 9/1994 | Hartig et al. | |
| 5,620,904 A | 4/1997 | Hanoka | |
| 5,688,585 A | 11/1997 | Lingle | |
| 5,700,305 A | 12/1997 | Lowe et al. | |
| 5,783,310 A | 7/1998 | Sano et al. | |
| 5,837,108 A | 11/1998 | Lingle | |
| 6,475,626 B1 | 11/2002 | Stachowiak | |
| 6,495,263 B2 | 12/2002 | Stachowiak | |
| 6,558,800 B1 | 5/2003 | Stachowiak | |
| 6,624,104 B2 | 9/2003 | Sakoske et al. | |
| 6,667,121 B2 | 12/2003 | Wang | |
| 6,686,050 B2 | 2/2004 | Lingle et al. | |
| 6,692,831 B2 | 2/2004 | Stachowiak | |
| 6,863,928 B2 | 3/2005 | Stachowiak | |
| 6,887,575 B2 | 5/2005 | Neuman | |
| 6,936,347 B2 | 8/2005 | Laird et al. | |
| 7,037,869 B2 | 5/2006 | Landa et al. | |
| 7,056,588 B2 | 6/2006 | Neuman | |
| 7,077,927 B2 | 7/2006 | Bottari et al. | |
| 7,166,359 B2 | 1/2007 | Kriltz et al. | |
| 7,189,458 B2 | 3/2007 | Ferreira | |
| 7,198,851 B2 | 4/2007 | Lemmer | |
| 7,217,460 B2 | 5/2007 | Nunez-Regueiro et al. | |
| 7,294,402 B2 | 11/2007 | Laird | |
| 7,736,546 B2 | 6/2010 | Prunchak | |
| 7,771,830 B2 | 8/2010 | Neuman | |
| 7,805,064 B2 | 9/2010 | Ragay et al. | |
| 7,858,191 B2 | 12/2010 | Lemmer | |
| 7,935,279 B2 | 5/2011 | Prunchak | |
| 7,998,320 B2 | 8/2011 | Laird | |
| 8,308,993 B2 | 11/2012 | Castillo et al. | |
| 8,748,327 B2 | 6/2014 | Park et al. | |
| 8,808,581 B2 | 8/2014 | Vernooy et al. | |
| 2004/0086652 A1* | 5/2004 | Degand | B32B 17/10036 427/402 |
| 2009/0115922 A1 | 5/2009 | Veerasamy | |
| 2009/0139165 A1* | 6/2009 | Prete | E06B 3/6604 52/204.593 |
| 2011/0176212 A1 | 7/2011 | Lu et al. | |
| 2011/0233481 A1 | 9/2011 | Alvarez | |
| 2012/0142140 A1 | 6/2012 | Li et al. | |
| 2012/0164420 A1 | 6/2012 | Lemmer et al. | |
| 2012/0219821 A1 | 8/2012 | Frank et al. | |
| 2012/0328803 A1 | 12/2012 | Theios | |
| 2013/0104980 A1 | 5/2013 | Sridharan et al. | |
| 2013/0160844 A1 | 6/2013 | Hörtheis et al. | |
| 2014/0007937 A1 | 1/2014 | Maeda | |
| 2014/0084223 A1 | 3/2014 | Guo | |
| 2014/0373909 A1 | 12/2014 | Zhang et al. | |

OTHER PUBLICATIONS

Written Opinion of the ISA for PCT/US2014/017899, dated May 16, 2014, 4 pages.

* cited by examiner

WINDOW UNITS MADE USING CERAMIC FRIT THAT DISSOLVES PHYSICAL VAPOR DEPOSITION (PVD) DEPOSITED COATINGS, AND/OR ASSOCIATED METHODS

This application is the U.S. national Phase of International Application No. PCT/US2014/017899 filed 24 February 2014 which designated the U. S. and claims the benefit of U.S. Application Ser. No. 61/771,060, filed on Feb. 28, 2013, the entire contents of each of which are hereby incorporated by reference.

Certain example embodiments of this invention relate to techniques for forming decorative and/or other patterns on glass substrates. More particularly, certain example embodiments of this invention relate to the use of a ceramic frit that dissolves an already-applied thin film coating (disposed via physical vapor deposition (PVD) or other suitable process). In certain example embodiments, the ceramic frit is aggressive in chemically removing the coating on which it is disposed, e.g., when exposed to high temperatures.

BACKGROUND AND SUMMARY OF EXAMPLE EMBODIMENTS OF THE INVENTION

A frit material oftentimes is provided around one or more peripheral edges of a glass substrate or the like. For instance, frit patterns may be used to hide building components and/or provide an aesthetically appealing appearance when incorporated into window or insulated glass (IG) unit used in a commercial or residential setting, to hide sensors and/or conceal how components are mounted to a windshield or other automotive or vehicular window/substrate, to provide solar control functionality, etc.

The frit pattern oftentimes is applied by silk-screening or another suitable printing process. Referring to FIG. 1, which schematically shows how a typical silkscreen related technique works, the screen printing process includes a glass substrate 10 screen printed in connection with a silkscreen drum 12 and wiper or doctor blade 13. The silkscreen drum 12 and wiper or doctor blade 13 cooperate to print an opaque or other material 11 onto a surface of the substrate 10 in a desired pattern. The desired pattern oftentimes includes a solid or stylized frame around one or more edges of the substrate, e.g., to help conceal mounting brackets, sensors and/or other electronic devices, electrical connections, serve as a decorative perimeter band, protect the mounting adhesive from exposure to ultraviolet light and degradation, function as a solar control coating, etc., as alluded to above.

The opaque material 11 may be of or include, for example, a ceramic frit. As is known, ceramic frits typically are composed of ground glass with a specific softening point combined with metals and oxides (e.g., chromium oxide, cobalt oxide, and/or nickel oxide, etc.) to attain the desired color (often a dark or black color), adhesion properties, durability, etc.

Referring to FIG. 2, the screen-printed substrate 10' includes a screen-printed opaque layer 14. The screen-printed opaque layer 14 may be used, for example, in the above-described and/or other applications. The opaque layer 14 in the FIG. 2 example is applied to peripheral areas of the first substrate 10 to form a decorative perimeter band and may protect the mounting adhesive from exposure to ultraviolet light and degradation, for example. The opaque layer 14 in a vehicle-type application may be used to display a Department of Transportation (DOT) code and/or trademark, to hide trim components and/or sensor mounts, etc.

Ceramic frits may be suspended in a medium (for example, a medium of or including oils or water) to allow printing of the patterns in liquid form. The medium may include volatile materials. Accordingly, the screen-printed substrate 10' that includes the opaque layer 14 may first be introduced into a drying oven or the like, e.g., to pre-cure the opaque layer 14 and remove a majority of the medium before the screen-printed substrate 10' is fully fired. The drying oven that pre-cures the opaque layer 14 may use any source of heat (for example, infrared or convection) or may substantially remove the volatile materials through ultraviolet radiation.

The frit material may be more permanently adhered to the glass when heat is applied at frit melting temperatures. This typically occurs during glass tempering at a glass fabricator.

For glass substrates that have a thin film coating applied on the surface to be silkscreened, the film typically must be removed prior to frit application. This oftentimes involves edge deletion, which typically is accomplished using mechanical means (e.g., in connection with an abrasive wheel or the like), and is performed so that the frit material can adequately bond to the underlying substrate. Indeed, in many cases, the fit will not form an adequate bond with the coating, components bonded to the inadequately adhered frit may not stay attached to the substrate upon the application of shear and/or other forces (e.g., as there the mechanical strength between the coating and the substrate is typically much lower than as between fused frit and the glass substrate), sealants will not adhere well to the underlying substrate, etc. Leaving the coating below the frit may also introduce unintended or undesired colorations, e.g., related to a delta E* shift associated with the coating. Abrasive wheels also tend to be slow, as they have limited areas of removal, and can sometimes damage the substrate itself.

Unfortunately, the edge deletion of the coating prior to the application of the frit sometimes will not be complete, e.g., because the edge deletion is not over a sufficiently broad surface area, is not deep enough, etc. Thus, the mechanical strength of the bond to the frit may be compromised over the whole or over part of the applied pattern. As alluded to above, edge deletion also can cause surface imperfections that affect the ability to adhere other components to the substrate, create a negative aesthetic appearances (e.g., in the form of a striped or other pattern), etc.

The silkscreen pattern could in theory be applied before the thin film coating. Unfortunately, however, the thin film coating oftentimes is applied by the glass maker. Thus, extensive handling, tracking, and transportation would be required and would not be cost effective in many cases, particularly if all parts of a typical production process are not performed at one location. Indeed, adapting this approach to a typical manufacturing scenario would involve the production of an uncoated substrate, the uncoated substrate being transported from the glass manufacturer to the fabricator to apply the silkscreen pattern, the shipping of the screen-printed substrate back to the fabricator or other party for thin film coating application, and then transportation back to the fabricator (e.g., for incorporation into an IG unit, a vehicle windshield, an architectural glazing, etc.).

Thus, it will be appreciated that there is a need in the art for improved techniques for applying a frit pattern (e.g., via silk-screening or the like) where a thin film coated glass substrate is involved, e.g., while still meeting customer desires and/or requirements in terms of, for example, adhesion and aesthetics.

One aspect of certain example embodiments relates to the use of an aggressive frit that can be applied to coated glass (e.g., by a fabricator). The aggressive frit, upon the application of heat associated with tempering or the like, may penetrate the thin film and bond to the glass to an adhesion/durability level comparable to that of conventional silkscreen operations.

Another aspect of certain example embodiments relates to the ability to avoid conventional mechanical edge deletion processes prior to deposition of the frit material, where thin film coated substrates are involved.

Still another aspect of certain example embodiments relates to the ability to provide a desired aesthetic appearance (e.g., coloration) with respect to the applied frit.

Yet another aspect of certain example embodiments relates to a process that comports with conventional flows as between a glass manufacturer, coater, fabricator, and/or other parties involved in the glazing production.

In certain example embodiments, a method of making a coated article is provided. A frit is screen-printed in a desired pattern on a glass substrate supporting a heat treatable thin-film coating, with at least a portion of the frit lying over and directly contacting the thin-film coating. The substrate with the thin-film coating and the frit thereon is heat treated in connection with a first temperature or first temperature range sufficient to (a) cause particles in the fit to migrate downwardly into the thin-film coating and dissolve the thin-film coating in areas lying under the pattern, and (b) fuse the frit directly to the substrate, in the desired pattern, in making the coated article.

In certain example embodiments, a method of making an IG unit is provided. A frit is printed in a desired pattern on a first glass substrate supporting a heat treatable PVD deposited thin-film coating, with at least a portion of the frit directly contacting the thin-film coating. The first substrate with the thin-film coating and the fit thereon is thermally tempered, with the thermal tempering dissolving the thin-film coating in areas where the frit contacts the thin film coating and fusing the frit directly to the substrate, in the desired pattern, in making an intermediate article. The intermediate is built article into the IG unit.

Coated articles, IG units, and/or the like made according to the techniques set forth herein also are provided in certain example embodiments.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to the use of a ceramic frit that dissolves an already-applied thin film coating (disposed via a physical vapor deposition (PVD) process such as sputtering or the like, or other suitable technique). In certain example embodiments, the ceramic frit is aggressive in chemically removing the coating on which it is disposed, e.g., when exposed to high temperatures. The frit advantageously fuses well with the glass, provides aesthetically desired colorations, and/or enables components (e.g., insulated glass (IG) unit spacers) to be reliably mounted thereon (e.g., using silicone, polysulfide, and/or other glues/sealant materials), in certain example embodiments. The frit, once it penetrates the thin film and bonds to the glass, may be provided at an adhesion and/or durability level comparable to that of conventional silkscreen operations with conventional enamels disposed directly on the glass. The approaches of certain example embodiments may advantageously reduce the need to perform conventional mechanical edge deletion processes prior to deposition of the frit material where thin film coated substrates are involved and may also provide a process flow that comports with conventional flows as between a glass manufacturer, coater, fabricator, and/or other parties involved in a glazing's production. Associated coated articles, IG units, methods, etc., are also contemplated herein. It will be appreciated that dissolving the frit is an inexpensive and safe way to edge delete that in certain example embodiments involves selectively dissolving only the sputter-deposited coating that is to be replaced with the frit, e.g., in IGU, structural glazing, and/or other applications.

Figure 1:
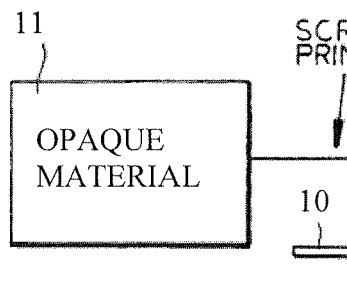
FIG. 1 schematically shows typical silkscreen related techniques.
Figure 2:
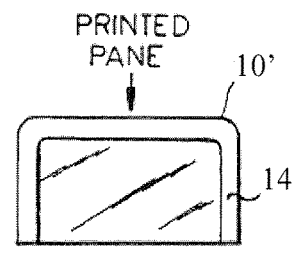
FIG. 2 shows a silkscreened intermediate article.
Figure 3:
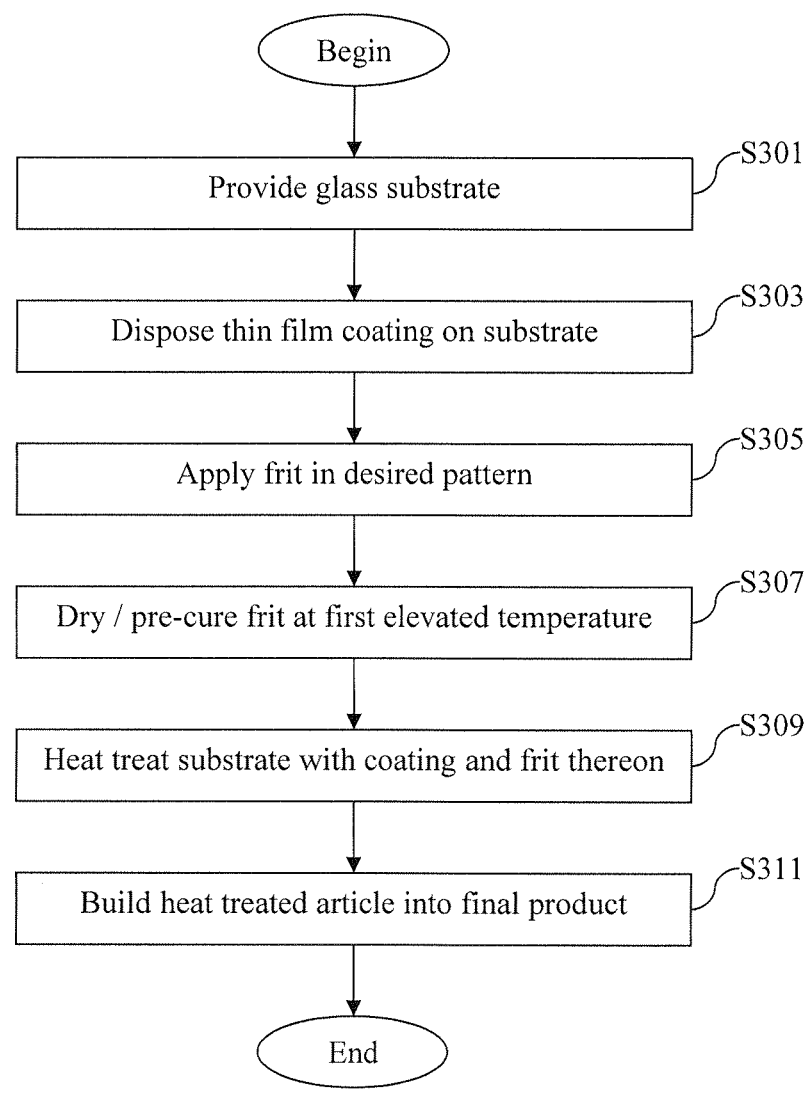
FIG. 3 is a flowchart showing an example process suitable for use in certain example embodiments.

Referring now more particularly to the drawings, FIG. 3 is a flowchart showing an example process suitable for use in certain example embodiments. A glass substrate is provided in step S301. A thin film coating is disposed on at least one major surface of the substrate in step S303. The thin film coating may be applied by any suitable means. For instance, a PVD process such as sputtering may be used in certain example embodiments to deposit a multi-layer low-emissivity (low-E) coating on the substrate. Low-E coatings generally involve one or more infrared (IR) reflecting layers sandwiched between one or more dielectric layers. The IR reflecting layer may be of or include, Ag, ITO, Ni and/or Cr, etc., and example low-E coatings include the SunGuard and ClimaGuard low-E coatings provided by Guardian Industries Corp. and its affiliates. These coatings include, for example, the SunGuard Solar, SunGuard HP, and SunGuard HS product lines.

ClimaGuard coatings (some of which may be heat treatable in certain instances) may be manufactured in accordance with one or more of U.S. Pat. Nos. 5,344,718; 6,475,626; 6,495,263; 6,558,800; 6,667,121; 6,686,050; 6,887,575; 6,692,831; 6,863,928; 6,936,347; 7,217,460; and 7,858,191, the entire contents of which are hereby incorporated herein.

SunGuard coatings (some of which may be heat treatable in certain instances) may be manufactured in accordance with one or more of U.S. Pat. Nos. 5,344,718; 5,688,585; 5,837,108; 6,475,626; 6,495,263; 6,558,800; 6,667,121; 6,686,050; 6,887,575; 6,692,831; 6,863,928; 6,936,347;

7,037,869; 7,166,359; 7,217,460; 7,294,402; and 7,858,191, the entire contents of which are hereby incorporated herein.

Still other low-E coatings that may be used in connection with certain example embodiments are described and/or illustrated in any of U.S. Pat. Nos. 7,998,320; 7,771,830; 7,198,851; 7,189,458; and 7,056,588; and/or U.S. Publication Nos. 2012/0219821; 2012/0164420; and 2009/0115922, the entire contents of each of which are all hereby incorporated herein by reference.

Figure 4:
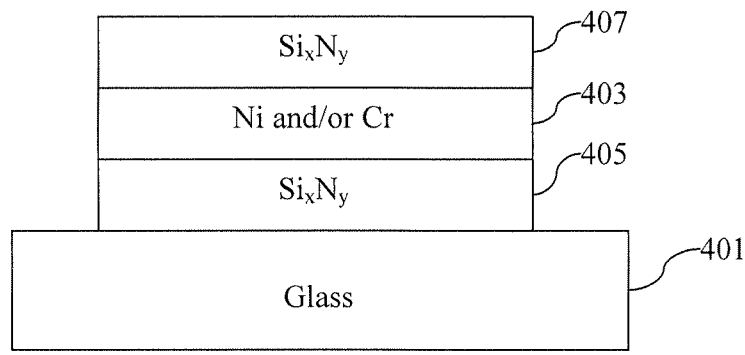
FIG. 4 is an example low emissivity (low-E) coating that may be used in connection with certain example embodiments.

FIG. 4 is an example low emissivity (low-E) coating that may be used in connection with certain example embodiments. The example layer stack shown in FIG. 4 comprises a glass substrate 401 that supports a layer comprising Ni and/or Cr 403 sandwiched between first and second silicon-inclusive layers 405 and 407. The layer comprising Ni and/or Cr 403 may be partially or fully oxided and/or nitrided in different example embodiments. In certain example embodiments, it may comprise Ni and/or Ti, optionally with Mo and/or Cr as well. The first and second silicon-inclusive layers 405 and 407 may be oxided and/or nitrided with any suitable stoichiometry (e.g., $Si_3N_4$ is one example stoichiometry), and they may have the same, similar, or different chemical compositions in different example embodiments. The first and second silicon-inclusive layers 405 and 407 may be doped with aluminum or the like in certain example instances.

The thicknesses of the layers in the FIG. 4 example layer stack may be adjusted to provide coatings of different colors. For example, by altering the layer thicknesses, it is possible to provide, light blue, royal blue, silver, neutral, pewter, and/or other colors. In certain example embodiments, the layer comprising Ni and/or Cr 403 may be split by a thin layer of or including silver in certain example embodiments. A thick overcoat layer comprising zirconium oxide and/or the like may be provided in certain example embodiments, e.g., to enhance durability.

Figure 5:
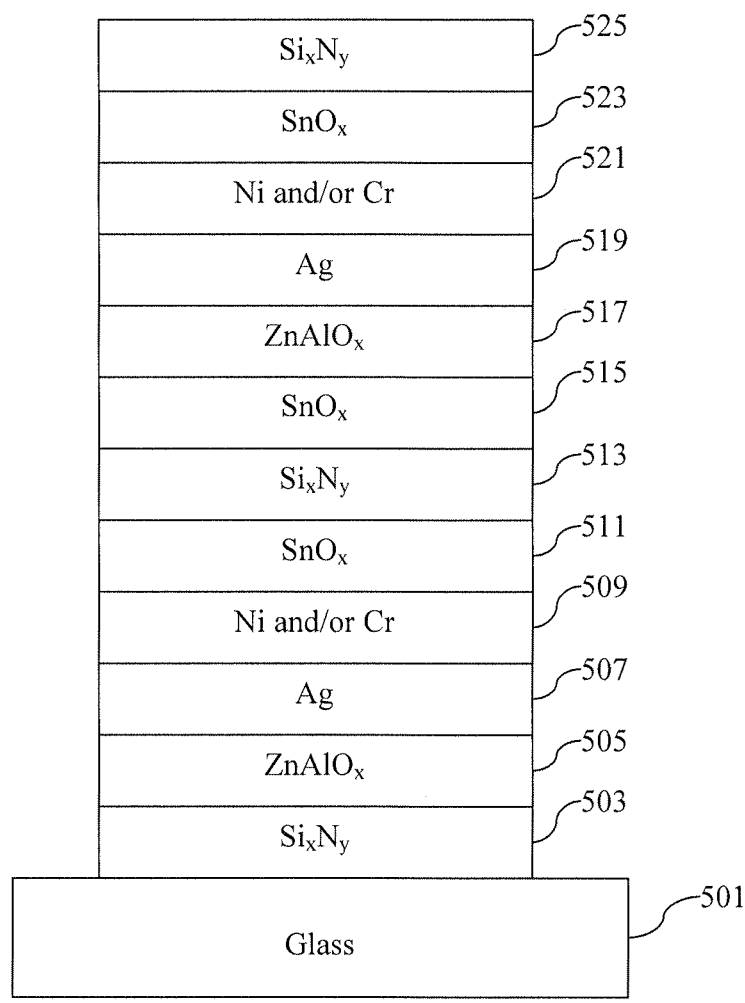
FIG. 5 is another example low-E coating that may be used in connection with certain example embodiments.

FIG. 5 is another example low-E coating that may be used in connection with certain example embodiments. The example coating in FIG. 5 comprises the following layers in order moving away from the glass substrate 501: a first silicon-inclusive layer 503, a first layer comprising zinc oxide 505, a first silver-based layer 507, a first layer comprising Ni and/or Cr 509, a first layer comprising tin oxide 511, and second silicon-inclusive layer 513, a second layer comprising tin oxide 515, a second layer comprising zinc oxide 517, a second silver-based layer 519, a second layer comprising Ni and/or Cr 521, a third layer comprising tin oxide 523, and a third silicon-inclusive layer 525.

Some or all of the silicon-inclusive layers 503, 513, and/or 525 may be oxided and/or nitrided with any suitable stoichiometry (e.g., $Si_3N_4$ is one example stoichiometry), and they may have the same, similar, or different chemical compositions in different example embodiments. Some or all of the layers comprising Ni and/or Cr 509 and/or 521 may be partially or fully oxided and/or nitrided in different example embodiments. In certain example embodiments, one or both may comprise Ni and/or Ti, optionally with Mo and/or Cr as well. The layers comprising zinc oxide 505 and 517 may serve as good seed layers for silver growth and may be doped with aluminum and/or silicon in different example embodiments.

In certain example embodiments, a layer comprising titanium oxide and/or the like maybe provided below the first silver-based layer 507, e.g., to improve the optics of the layer stack. In certain example embodiments, rather than the second silicon-based layer 513 splitting the first and second layers comprising tin oxide 511 and 515, the first layer comprising tin oxide 511 may be kept and the second silicon-based layer 513 may be split with a layer comprising Ni and/or Cr (that may be metallic, or partially or fully oxided and/or nitrided, etc.).

As will be appreciated from the description above and the patent documents incorporated by reference herein, single, double, triple, etc., silver-based low-E coatings may be provided in certain example embodiments.

Referring once again to FIG. 3, in step S305, a frit material is applied in a desired pattern. As alluded to above, this may involve a solid black (or other color) border along one or more peripheral edges of a substrate. The frit may be applied using a silkscreen or other printing process, preferably using a standard screen and standard operating conditions. This may include for example, using a 408 mesh to apply wet fit material to conventional thicknesses as discussed in greater detail below.

In step S307, the frit may be dried and/or pre-cured at a first elevated temperature (e.g., less than 400 degrees C., more preferably less than 300 degrees C., still more preferably less than 250 degrees C., and sometimes between 150-200 degrees C.). Once the frit is suitably dried and/or pre-cured, the substrate with the frit and coating thereon may be cut to an appropriate size, and/or multiple intermediate coated articles may be produced from a larger substrate. Following this optional sizing process, the substrate(s) may be heat treated with the coating and the frit thereon, e.g., as indicated in step S309. This may occur at a second elevated temperature that is higher than the first elevated temperature. In certain example embodiments, temperatures associated with heat treating may be used. It will be appreciated that it is therefore possible in certain example embodiments to avoid complex and expensive cut-to-size coating processes for perimeter-coated glass by using heat-treatable low-E and/or coatings printed with the coating-dissolving frit.

In certain example embodiments, step S305 (with or without step S307) may be repeated to create a "double-silkscreen" pattern that is the same across, or different as between, each repetition. "Double-silkscreening" may be advantageous where silicone-based and/or other seals are used, e.g., to ensure that all of the underlying coating is dissolved, that there are no or substantially no pockets of material remaining, that no bubbles from out-gassing dissolved low-E related materials are trapped, etc.

The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments. It will be appreciated that the coating preferably is structured so as to be heat treatable.

It has been found that low-E coatings reflect heat and, as a result, higher than expected temperatures may be desirable in certain implementations. Additional convention can be added in this regard, and such additional convection is desirable when a band of coatings about 1 cm or wider is to be removed.

Unlike the drying and/or curing associated with step S307, the heat treatment associated with step S309 may trigger a chemical process involving the fit. That is, in certain example embodiments, particles that had been suspended in frit may, in response to the heat treatment, migrate downwardly into coating. These particles may include fluorine and/or bismuth based particles in certain example embodiments. U.S. Publication No. 2011/0233481, for example, describes a fluorinated silver paste for forming electrical connections in highly dielectric films by "eating through" thick dielectric layers. The entire contents of this publication are hereby incorporated by reference herein. The downward migration may chemically dissolve or otherwise "eat away at" the underlying low-E or other coating. Bubbling, out-gassing, and/or the like may be observable as a part of this process.

Following the heat treatment, the frit becomes fully enameled and is flat and smooth. Instead of just surface removal as to the underlying low-E or other coating, at least 80% of the underlying coating's thickness is dissolved, more preferably at least 90% of the underlying coating's thickness is dissolved, and still more preferably at least 95-100% of the coating's thickness is dissolved, via this process. The heat-activated chemical reaction thus preferably removes substantially all of the coating from the underlying areas, resulting in a chemically oriented edge deletion process. As indicated above, multiple silkscreen printings may be performed, e.g., to aid in the chemical edge deletion/coating dissolving process.

The frit may include ingredients selected so as to impart a desired post-firing coloration. In many cases, the desired coloration will be black. Advantageously, because the underlying low-E or other coating is removed, it is possible to see the "true" color of frit, rather than the color resulting from the combination of the frit and coating that otherwise has been found to shift the color from what would be expected if frit were applied alone. For instance, the color shift away from the "true" color of frit is associated with a delta E* value of less than 3, more preferably less than 2, and still more preferably less than 1 or 1.5. By contrast, leaving the low-E coating under many scenarios would be expected to cause a delta E* value of about 2 away from the "true" color of frit.

Figure 6:
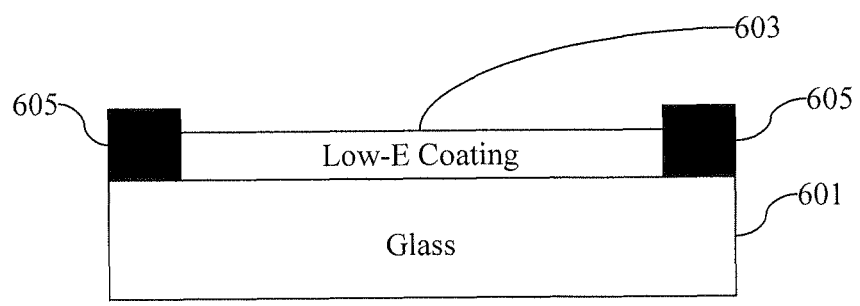
FIG. 6 is a cross-sectional view of an illustrative coated article according to certain example embodiments.

FIG. 6 is a cross-sectional view of an illustrative coated article according to certain example embodiments. As can be seen in FIG. 6, the glass substrate 601 supports a low-E and/or other coating 603, as well as a frit material 605 provided along peripheral edges of the substrate 601. Despite the low-E and/or other coating 603 having been initially applied over substantially an entire major surface of the substrate 601, the frit 605 is in direct physical contact with the major surface because it has dissolved the low-E coating and/or other coating 603 in the portions that previously were underneath it during the heat treatment. In certain example embodiments, this band of material may be 5-10 cm of black or any suitable color in a desired area or pattern (e.g., at and/or along one or more peripheral edges). It will be appreciated that conventionally edge deleting this area would be quite time consuming and difficult in terms of generating an even and uniformly pleasing aesthetic appearance.

In general, fired thickness has been found to be about one-half of the wet thickness. A typical frit for a conventional IG unit related application will be applied to an initial, wet thickness of about 20-100 microns thick (with an example thickness being 50 microns thick). This initial wet thickness may be developed using a conventional silkscreen printer and mesh (e.g., 408 mesh) as noted above. The ultimate fired thickness will be about 7-60 microns thick (with the example wet thickness of 50 microns producing a 25-30 micron thick pattern after firing that is completely opaque). Frit material applied to a wet thickness of 35-65 microns is advantageous when complete opacity is desirable. It has been found that lower thicknesses will still serve a coating dissolving function, but the final opacity will be lower/the final transparency will be higher. For example, a frit material applied to a wet thickness of 20 microns produced a 10 micron thick final enamel, but the coating was only semi-opaque. Visible transmission in a semi-transparent state typically will be greater than about 40%. In both sample cases, mechanical durability and adhesion tests were passed.

In step S311, the heat treated article is built into a final product. The enameled frit coating forms a good bond with the glass. Advantageously, the remaining glass-frit bond is compatible with relevant glazing materials, such as structural glazing silicones, IG unit sealants, spacer materials, etc. For instance, in certain example embodiments, it becomes possible to adhere a spacer system for an IG unit directly on the frit while still meeting desired or required adhesive strength requirements, e.g., when the IG unit is the desired final product.

Figure 7:
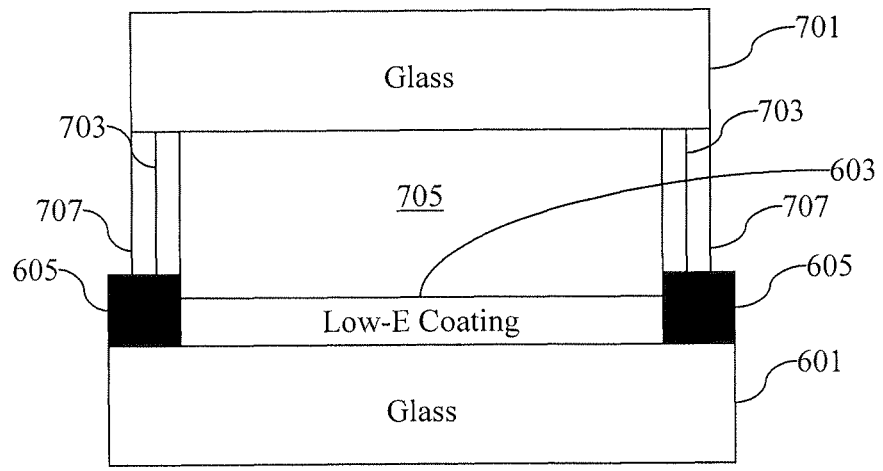
FIG. 7 is a cross-sectional view of an illustrative insulated glass (IG) unit according to certain example embodiments.

In this regard, FIG. 7 is a cross-sectional view of an illustrative IG unit according to certain example embodiments. As can be seen, the example coated article of FIG. 6 is incorporated into the example IG unit shown in FIG. 7. Thus, the IG unit in the FIG. 7 example includes two sheets of glass 601 and 701. One or both of the sheets of glass may be heat treated (e.g., thermally tempered or heat strengthened), but alternatively may be left in the annealed state in other cases. In still other cases, one or both of the substrates may be laminated to another substrate. As will be appreciated from the description above, at least glass substrate 601 likely will be heat treated in the enamel-forming phase. A spacer 703 of or including aluminum or other suitable material helps maintain the substrates 601 and 701 in substantially parallel, spaced-apart relation to one another. The spacer 703 sometimes includes a cavity area that may be filled with a dry dessicant material (e.g., of or including aluminum silicate or the like). A cavity or pocket 705 thus is defined and may be filed with an inert gas such as, for example, Ar, Kr, Xe, and/or the like. A sealant 707 is formed around the edges and bonds to the spacer and inner peripheral edge surfaces of the substrates 601 and 701. The substrates 601 and 701 may be the same or differently sized in different example embodiments.

The low-E and/or other coating 603 may be provided on any one or more surfaces of a glazing (e.g., surfaces 1, 2, 3, and/or 4) in different example embodiments. Antireflective (AR) coatings may be provided on some or all of the remaining surfaces in different example embodiments. In certain example embodiments, the coating 603 may have AR properties.

Certain example embodiments preferably will pass the following and/or other tests for frit enamels:
 ASTM C724-91 Standard Test Method for Acid Resistance of Ceramic Decorations on Architectural-Type Glass;
 ASTM C1203-04 Standard Test Method for Quantitative Determination of Alkali Resistance of a Ceramic-Glass Enamel; and
 Test Method B of India Ink Test of ASTM C1048-04 Standard Specification for Heat-Treated Flat Glass—Kind HS, Kind FT Coated and Uncoated Glass.

Certain example embodiments preferably will involve firing conditions that result in the finished product meeting the heat strengthened and temper requirements of ASTM C1048-04 Standard Specification for Heat-Treated Flat Glass—Kind HS, Kind FT Coated and Uncoated Glass. Certain example embodiments also preferably will dissolve the low-E and/or other applied (e.g., PVD-deposited) coating sufficient to create a frit/sealant interface that meets the structural performance requirements of a glass/sealant interface.

IG units made according to certain example embodiments preferably will pass tests according to EN1279-2, e.g., concerning aging behaviors including requirements for moisture penetration; and/or ETAG 002 tests concerning structural sealant requirements.

It will be appreciated from the description above that certain example embodiments relate to a frit that promotes complete or substantially complete edge deletion, produces a frit substantially free from color deviations away from the expected norm, leaves the remaining coating intact, and avoids striping and/or damage to substrate sometimes caused by mechanical edge deletion, etc.

The frit material, once fired, preferably will survive tests simulating aging, prolonged UV exposure, high temperature/high humidity environments (e.g., using 85 degree C. temperatures at 85% relative humidity tests), etc.

Although certain example embodiments have been described as involving a black frit material, certain example embodiments may include alternate pigments or color additives, e.g., so that the frit creates an opaque or semi-opaque enamel of one or more different colors. For example, a wide variety of colors could be used in connection with a host of alternative pigments, e.g., to create articles with desired painted patterns that are opaque and/or at least partially light transmissive. In certain example embodiments, one or more colors may be screen printed on a substrate to create one or more desired patterns thereon. In certain example embodiments, at least a portion of the substrate will have a pattern screen printed thereon. This may include, for example, painting a pattern on one or both major surfaces of the substrate, e.g., over only a portion and/or substantially the entire area(s) thereof. One example is a single, substantially uniform color being screen printed on the entire or substantially the entire major surface(s) of the substrate(s).

Thus, it will be appreciated that certain example embodiments involve a heat treated substrate with a substantially uniform, colored partially opaque layer disposed over all or substantially all of a major surface of the glass substrate. That substrate may be bent and/or left flat. In certain example embodiments, the opaque layer may be provided on or on a surface opposite the low-E coating, e.g., in situations where bonding to another component is not required.

It will be appreciated that the example techniques described herein may be used in connection with a variety of different applications. For example, the IG units described herein may be used as windows, skylights, transoms, sidelites, and/or the like in residential (e.g., home) and/or commercial (e.g., office building) settings. They also may be used in commercial transportation and/or other vehicles.

Certain example embodiments have been described in connection with IG units include two substrates. This includes, for example, vacuum insulated glass (VIG) units, where first and second substrates are separated from one another via a plurality of pillars and an edge seal material that oftentimes is made of a glass frit material, and in which the area between the two substrates is evacuated to a pressure less than atmospheric. In such cases, the seal may connect with the substrates and the frit or other edge seal material.

It is noted, however, that the example techniques disclosed herein may be used in connection with units that include more than two substrates. This includes the laminated assemblies discussed above, as well as so-called "triple glaze" IG units, where first and second substrates are separated by a first spacer system, and second and third substrates are separated by a second spacer system. In such cases, two different seals may be provided, one for each of the spacer systems. In other cases, one large seal may be provided.

"Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s).

Although an element, layer, layer system, coating, or the like, may be said to be "on" or "supported by" a substrate, layer, layer system, coating, or the like, other layers and/or materials may be provided therebetween. Thus, for example, the seals described above may be considered "on" and "supported by" the substrates even if other layer(s) (e.g., low-E coatings) are provided therebetween.

In certain example embodiments, a method of making a coated article is provided. A frit is screen-printed in a desired pattern on a glass substrate supporting a heat treatable thin-film coating, with at least a portion of the frit lying over and directly contacting the thin-film coating. The substrate with the thin-film coating and the frit thereon is heat treated in connection with a first temperature or first temperature range sufficient to (a) cause particles in the frit to migrate downwardly into the thin-film coating and dissolve the thin-film coating in areas lying under the pattern, and (b) fuse the frit directly to the substrate, in the desired pattern, in making the coated article.

In addition to the features of the previous paragraph, in certain example embodiments, the thin-film coating may be a multi-layer sputter deposited coating.

In addition to the features of either of the two previous paragraphs, in certain example embodiments, prior to said heat treating, the frit may be dried and/or pre-cured at a second temperature or in a second temperature range that does not exceed 250 degrees C.

In addition to the features of any of the three previous paragraphs, in certain example embodiments, the frit may be dried and/or pre-cured at a third temperature or in a third temperature range insufficient to cause particles in the fit to migrate downwardly into the thin-film coating and dissolve the thin-film coating in areas lying under the pattern, and fuse the frit directly to the substrate, in the desired pattern, in making the coated article.

In addition to the features of any of the four previous paragraphs, in certain example embodiments, the heat treating may be thermal tempering.

In addition to the features of any of the five previous paragraphs, in certain example embodiments, the first temperature or first temperature range may meet or exceed 600 degrees C.

In addition to the features of any of the six previous paragraphs, in certain example embodiments, the first temperature or first temperature range may meet or exceed 620 degrees C. to take into account heat reflected by the thin-film coating.

In addition to the features of any of the seven previous paragraphs, in certain example embodiments, the thin-film coating may be a multi-layer low-E coating.

In addition to the features of the previous paragraph, in certain example embodiments, the low-E coating may comprise at least one infrared (IR) reflecting layer sandwiched between first and second dielectric layers or layer stacks. For instance, each said IR reflecting layer may comprise silver.

In addition to the features of either of the two previous paragraphs, in certain example embodiments, the low-E coating may include a layer comprising Ni and/or Cr sandwiched between first and second layers comprising silicon.

In addition to the features of any of the ten previous paragraphs, in certain example embodiments, the frit may be silkscreened to a wet thickness of 35-100 microns, may have a fired thickness of approximately half the wet thickness, and/or may be opaque post heat treatment. Alternatively, or in addition, in addition to the features of any of the ten previous paragraphs, in certain example embodiments, the frit may be silkscreened to a wet thickness of less than 35 microns, may have a fired thickness of approximately half the wet thickness, and/or may have a visible transmission of at least 40%.

In addition to the features of any of the 11 previous paragraphs, in certain example embodiments, the screen printing of the frit in the desired pattern may be repeated.

In addition to the features of any of the 12 previous paragraphs, in certain example embodiments, the substrate may be cut into a desired size and/or shape following said screen-printing and prior to said heat treating.

A coated article may be made according to the method in any one of the previous 13 paragraphs in certain example embodiments.

In certain example embodiments, a method of making an insulated glass (IG) unit is provided. A frit is printed in a desired pattern on a first glass substrate supporting a heat treatable physical vapor deposition (PVD) deposited thin-film coating, with at least a portion of the frit directly contacting the thin-film coating. The first substrate with the thin-film coating and the frit thereon is thermally tempered, with the thermal tempering dissolving the thin-film coating in areas where the frit contacts the thin film coating and fusing the frit directly to the substrate, in the desired pattern, in making an intermediate article. The intermediate is built article into the IG unit.

In addition to the features of the previous paragraph, in certain example embodiments, a spacer system may be oriented around a peripheral edge of the intermediate article; a second substrate may be located on the spacer system so that the first and second substrates are substantially parallel to and spaced apart from one another; and an adhesive may be applied to one or more mating areas of the spacer system, the first substrate, and the second substrate, to seal together the IG unit.

In addition to the features of either of the two previous paragraphs, in certain example embodiments, the thin-film coating may be a multi-layer sputter deposited low-emissivity (low-E) coating comprising at least one infrared (IR) reflecting layer sandwiched between first and second dielectric layers or layer stacks.

In addition to the features of the previous paragraph, in certain example embodiments, each said IR reflecting layer may comprise silver; ITO; or Ni and/or Cr.

In addition to the features of any of the four previous paragraphs, in certain example embodiments, prior to said heat treating, the frit may be dried and/or pre-cured at a temperature that does not exceed 250 degrees C.

In addition to the features of any of the five previous paragraphs, in certain example embodiments, the IG unit may pass tests according to EN1279-2 concerning aging behaviors including requirements for moisture penetration; and/or tests according to ETAG 002 concerning structural sealant requirements.

In addition to the features of any of the five previous paragraphs, in certain example embodiments, the thin-film coating may be removed via the thermal tempering of the fit without using another form of edge deletion. For instance, in addition to the features of any of the five previous paragraphs, in certain example embodiments, mechanical edge deletion need not be used in removing portions of the thin-film coating.

An insulated glass (IG) unit may be made according to the method in any one of the previous seven paragraphs in certain example embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making an intermediate article to be used in an insulated glass (IG) unit, the method comprising:
    printing a frit in a desired pattern on a first glass substrate supporting a heat treatable physical vapor deposition (PVD) deposited infrared (IR) reflecting multi-layer coating, at least a portion of the frit directly contacting the coating;
    wherein the coating comprises at least one IR reflecting layer sandwiched between at least first and second dielectric layers;
    thermally tempering the first glass substrate with the coating and the frit thereon, the thermal tempering dissolving the coating in areas where the frit contacts the coating and fusing the frit directly to the first glass substrate in making an intermediate article configured to be used in the IG unit.

2. The method of claim 1, further comprising:
    orienting a spacer system around a peripheral edge of the intermediate article;
    locating a second substrate on the spacer system so that the first and second substrates are substantially parallel to and spaced apart from one another; and
    applying an adhesive to one or more mating areas of the spacer system, the first substrate, and the second substrate to seal together the IG unit.

3. The method of claim 1, wherein said IR reflecting layer comprises silver; ITO; or Ni and/or Cr.

4. The method of claim 1, further comprising, prior to said thermally tempering, drying and/or pre-curing the frit at a temperature that does not exceed 250 degrees C.

5. The method of claim 1, wherein the coating is removed proximate the frit via the dissolving without using another form of edge deletion.

6. The method of claim 1, wherein mechanical edge deletion is not used in removing portions of the coating.

7. The method of claim 1, wherein the IR reflecting layer comprises silver.

8. The method of claim 1, wherein the first and second dielectric layers each comprise silicon nitride.

9. The method of claim 1, wherein the first dielectric layer comprises zinc oxide and the second dielectric layer comprises silicon nitride.

10. The method of claim 1, wherein the coating further comprises a layer comprising Ni and/or Cr located over and directly contacting the IR reflecting layer, and wherein the IR reflecting layer comprises silver.

11. The method of claim 1, further comprising coupling the first glass substrate with the coating and frit thereon to another glass substrate via at least one spacer in making the IG unit, so that an air gap is provided between the first and second glass substrates in the IG unit.

12. The method of claim 11, wherein the IG unit passes tests according to EN1279-2 concerning aging behaviors including requirements for moisture penetration; and/or tests according to ETAG 002 concerning structural sealant requirements.

13. The method of claim 1, wherein said printing comprises screen printing.

* * * * *